(12) United States Patent
Liao et al.

(10) Patent No.: US 10,379,638 B2
(45) Date of Patent: Aug. 13, 2019

(54) METHOD OF DETERMINING ADAPTIVE DPI CURVE

(71) Applicant: PIXART IMAGING INC., Hsin-Chu (TW)

(72) Inventors: Chi-Chieh Liao, Hsin-Chu (TW); Han-Shu Lin, Hsin-Chu (TW); Tse-Chung Su, Hsin-Chu (TW)

(73) Assignee: PIXART IMAGING INC., Hsin-Chu County (TW)

( * ) Notice: Subject to any disclaimer, the term of this patent is extended or adjusted under 35 U.S.C. 154(b) by 538 days.

(21) Appl. No.: 14/593,043

(22) Filed: Jan. 9, 2015

(65) Prior Publication Data

US 2015/0205375 A1    Jul. 23, 2015

(30) Foreign Application Priority Data

Jan. 23, 2014    (TW) .............................. 103102427 A

(51) Int. Cl.
| G09G 1/00 | (2006.01) |
| G06F 3/038 | (2013.01) |
| G06F 3/041 | (2006.01) |
| G06F 3/0354 | (2013.01) |
| G06F 3/02 | (2006.01) |

(52) U.S. Cl.
CPC ............ *G06F 3/038* (2013.01); *G06F 3/0213* (2013.01); *G06F 3/03547* (2013.01); *G06F 3/0416* (2013.01)

(58) Field of Classification Search
CPC .......... G06F 3/038; G06F 3/033; G06F 3/042; A63F 13/00
See application file for complete search history.

(56) References Cited

U.S. PATENT DOCUMENTS

| 2012/0169653 | A1* | 7/2012 | Chang ................... G06F 3/0418 345/174 |
| 2013/0002600 | A1* | 1/2013 | McCracken ............ G06F 3/044 345/174 |
| 2013/0002609 | A1* | 1/2013 | Lim ........................ G06F 3/042 345/175 |
| 2014/0006995 | A1* | 1/2014 | Bao ..................... G06F 3/04886 715/773 |
| 2014/0145990 | A1* | 5/2014 | Ho ........................ G06F 3/0484 345/173 |
| 2014/0357370 | A1* | 12/2014 | Soelberg, III ......... A63F 13/428 463/37 |

FOREIGN PATENT DOCUMENTS

| CN | 101714035 A | 5/2010 |
| CN | 103353804 A | 10/2013 |

* cited by examiner

*Primary Examiner* — Michael A Faragalla
(74) *Attorney, Agent, or Firm* — Hauptman Ham, LLP

(57) ABSTRACT

A method of determining an adaptive DPI curve includes the steps of: detecting, by a sensing element, an object on a touch surface and outputting a detected frame; calculating, by a processing unit, a contact range according to the detected frame; and determining a DPI curve according to the contact range.

7 Claims, 8 Drawing Sheets

METHOD OF DETERMINING ADAPTIVE DPI CURVE

RELATED APPLICATIONS

The present application is based on and claims priority to Taiwanese Application Number 103102427, filed Jan. 23, 2014, the disclosure of which is hereby incorporated by reference herein in its entirety.

BACKGROUND

1. Field of the Disclosure

This disclosure generally relates to a touch control device and, more particularly, to a touch control device and a determining method thereof, which determine a DPI curve according to contact areas of different objects.

2. Description of the Related Art

The conventional touch control device, such as a touch pad, generally has a touch surface and a processing unit. When a user moves his/her finger on the touch surface, the processing unit calculates a two-dimensional coordinate position of the finger corresponding to the touch surface and generates a displacement signal. Then, the processing unit outputs the displacement signal with a DPI (dots per inch) value to a host and correspondingly controls a cursor movement of the host.

FIG. 1A is a schematic diagram of a DPI curve, wherein the x-axis indicates a moving velocity (unit: inch per sec) of an object (e.g. the finger), and the y-axis indicates a cursor DPI corresponding to the object. The DPI curve represents a relationship between a moving velocity of a cursor and dots per inch. When a moving velocity of an object is slower, e.g. for editing an image, the cursor DPI becomes smaller so that a cursor corresponding to the object is accurately moved within a small region. And when the moving velocity is faster, e.g. for playing a computer game, the cursor DPI becomes larger so that the object controls the cursor to move for a long distance without moving too far. Therefore, an input device using a DPI curve provides a better user experience.

However, fingers of different users (e.g. adults and children) or even different fingers of the same user change a contact range with the touch surface. Thus, within the region of the touch pad, especially for a mini touch pad, a movable distance for a big object is obviously smaller compared to a movable distance for a small object. For example, referring to FIG. 1B, when an index finger 93 with a smaller contact range horizontally moves on a touch pad 91 from the left side to the right side thereof, a maximum travel distance $X_{93}$ is obtained. When a thumb 95 with a larger contact range horizontally moves on the same touch pad (shown as 91' herein) from the left side to the right side thereof, another maximum travel distance $X_{95}$ is obtained. Obviously, since the contact range of the index finger 93 is smaller than that of the thumb 95, the maximum travel distance $X_{93}$ is larger than the maximum travel distance $X_{95}$. Accordingly, cursors $C_{93}$ and $C_{95}$ on display screens 81 and 81' corresponding to the touch pads 91 and 91' respectively move over distances $X_{93}'$ and $X_{95}'$, wherein $X_{93}'>X_{95}'$. Therefore, a shorter travel distance for a bigger object leads to the problem of a shorter travel distance for a cursor being moved.

SUMMARY

Accordingly, the present disclosure provides a touch control device and a determining method thereof that determine different DPI curves through calculating contact ranges of different objects.

The present disclosure provides a method of determining an adaptive DPI curve and a touch control device using the same that determine different DPI curves through calculating contact ranges of different objects.

The present disclosure further provides a method of determining an adaptive DPI curve and a touch control device using the same that have the effect of allowing travel distances of the cursor corresponding to different objects to substantially be identical.

The present disclosure provides a touch control device with an adaptive DPI curve. The touch control device includes a touch surface, a sensing element and a processing unit. The touch surface is configured for an object operating thereon. The sensing element is configured to detect and output a detected frame of the object in contact with the touch surface. The processing unit is configured to calculate a contact range according to the detected frame and determine a DPI curve accordingly.

The present disclosure further provides a method of determining an adaptive DPI curve. The method includes the steps of: detecting, by a sensing element, an object in contact with a touch surface and outputting a detected frame; calculating, by a processing unit, a contact range according to the detected frame; and determining a DPI curve according to the contact range.

The present disclosure further provides a method of determining an adaptive DPI curve. The method includes the steps of: detecting, by a sensing element, a first object in contact with a touch surface at a first time and outputting a first detected frame; calculating, by a processing unit, a first contact range according to the first detected frame; detecting, by the sensing element, a second object in contact with the touch surface at a second time and outputting a second detected frame; calculating, by the processing unit, a second contact range according to the second detected frame; and determining a DPI curve according to a variation between the second contact range and the first contact range.

In one embodiment, a contact range is obtainable according to a comparison result between the detected variation of a plurality of detection units of a sensing element and a threshold.

In one embodiment, a processing unit calculates a sum of intensities of each column or each row of detection units in a detected frame to obtain a variation curve, and the contact range is calculated according to the variation curve.

The touch control device according to the embodiment of the present disclosure calculates a contact range of an object on a touch surface and determines a DPI curve according to the contact range. In addition, the accuracy for determining a DPI curve is improved through calculating a variation between contact ranges of the object according to detected frames successively outputted from the sensing element.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1A:
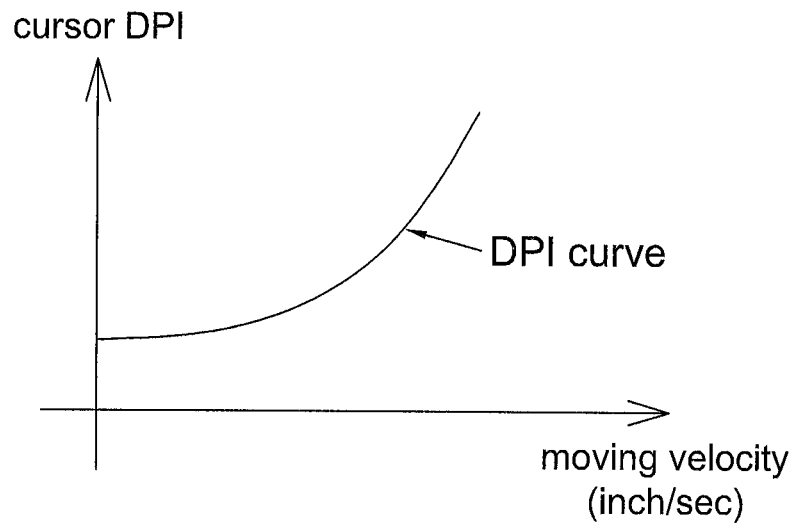
FIG. 1A is a schematic diagram of a DPI curve.
Figure 1B:
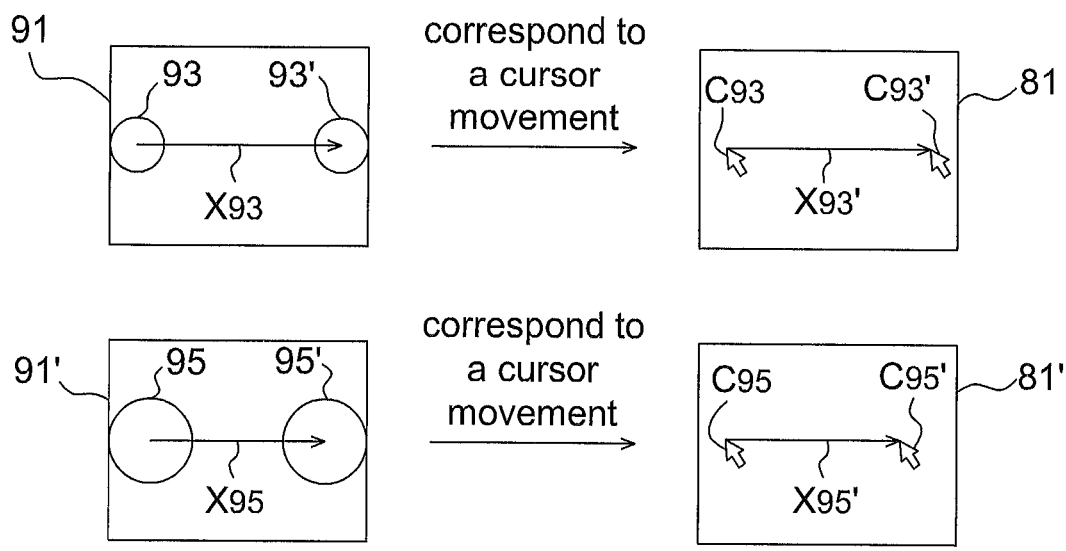
FIG. 1B is a schematic diagram of different fingers operating on a touch pad and cursor movements corresponding thereto.
Figure 2A:
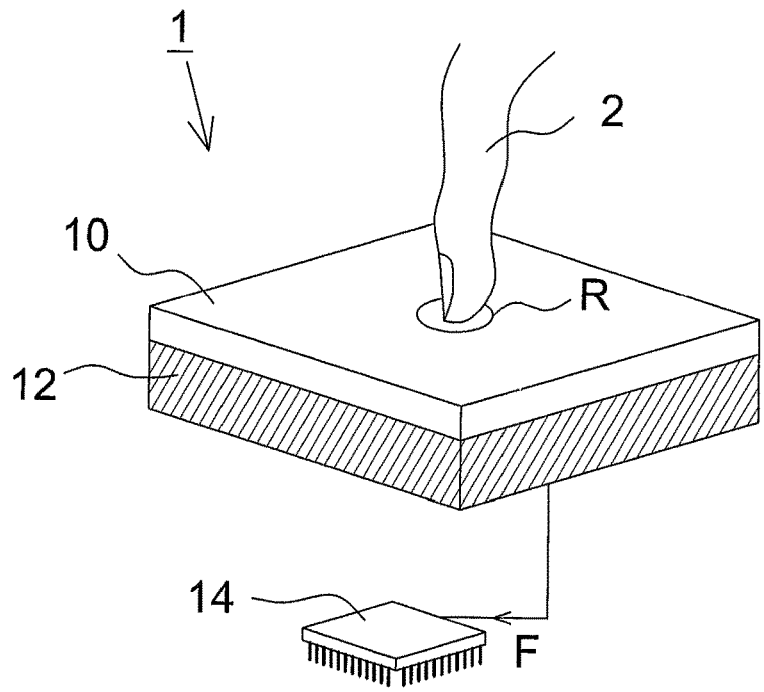
FIG. 2A is a schematic diagram of a touch control device with an adaptive DPI curve according to one embodiment of the present disclosure.

FIG. 2A is a schematic diagram of a touch control device 1 with an adaptive DPI curve according to one embodiment of the present disclosure. The touch control device 1 includes a touch surface 10, a sensing element 12 and a processing unit 14. The sensing element 12 is electrically connected to the processing unit 14. A user touches the touch surface 10 with an object 2 (a finger shown herein), and the processing unit 14 calculates a position or a position variation of the object 2 with respect to the touch surface 10 according to detected frames F generated by the sensing element 12 successively detecting the object 2. A cursor (not shown) on a display device correspondingly moves according to the position or the position variation. It is appreciated that a host is generally connected between the touch control device 1 and the display device for transferring the position or the position variation to an electrical signal.

Figure 2B:
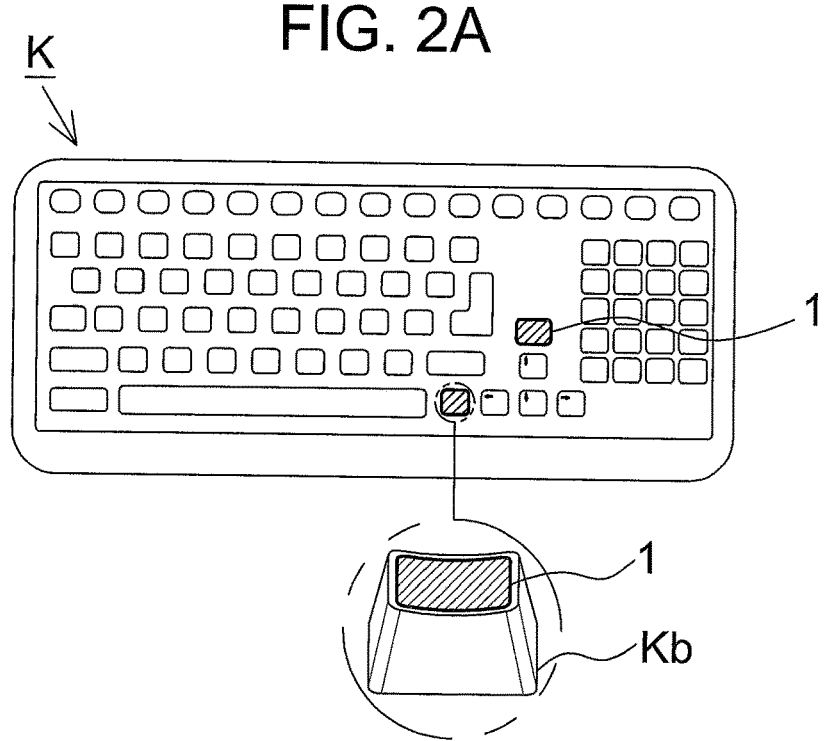
FIG. 2B is a schematic diagram of the touch control device of FIG. 2A integrated with a keyboard.

The touch control device 1 may be integrated with a keyboard K, as shown in FIG. 2B, wherein two integrated methods are exemplarily shown. The keyboard K has a plurality of keys (i.e. key caps). In one aspect, the touch control device 1 is integrated with one key Kb of the plurality of keys; meanwhile, a press function of the key Kb is also reserved. In another aspect, the touch control device 1 is independently integrated on the keyboard K without being integrated with any key, for example, an upper region relative to arrow keys.

The touch control device 1 of the present disclosure is not limited to be integrated with the keyboard K. In one embodiment, the touch control device 1 is integrable with other devices, for example a fingerprint recognition module, to form a multi-function touch pad. In other embodiments, the touch control device 1 is integrated with a navigation device (e.g. a presenter, a remote controller or a game pad), a cellphone or a computer system.

Referring to FIG. 2A continuously, the touch surface 10 is configured for an object 2 operating thereon. Since the touch control device 1 corresponds to a display device, the touch surface 10 and the display device may have an identical shape, e.g. a rectangular shape, but not limited thereto. The touch surface 10 is a surface of an appropriate object.

The sensing element 12 is configured to detect and output a detected frame F of the object 2 in contact with the touch surface 10. In the present embodiment, the sensing element 12 is disposed below the touch surface 10, as shown in FIG. 2A, but not limited thereto. The relative position between the sensing element 12 and the touch surface 10 is determined according to the actual application.

In one embodiment, the sensing element 12 is a capacitive touch sensor, wherein the capacitive touch sensor has a plurality of detection units. When the object 2 contacts the touch surface 10, the detection units under the object 2 and around the object 2 correspondingly generate the capacitance variation, and then the sensing element 12 outputs a detected frame F. Similar to the capacitive touch sensor, when a resistive touch sensor or an optical touch sensor is used as the sensing element 12, the sensing element 12 outputs detected frames F including voltage variations or photosensitive variations. For simplifying the description, the capacitive touch sensor is used as the sensing element 12 in the embodiment of the present disclosure.

The principles and structures of the capacitive touch sensor, resistive touch sensor and optical touch sensor mentioned above are well known, and thus details thereof are not described herein. It should be mentioned that the material of the object 2 is not particularly limited and is determined according to the type of the sensing element 12. For example, when the sensing element 12 is a capacitive touch sensor, the object 2 is preferably a finger or a capacitive touch pen. When the sensing element 12 is an optical touch sensor, the object 2 preferably has light blocking characteristics.

The processing unit 14 is, for example, a digital signal processor (DSP) or other processing devices that are configured to process the detected frame F so as to calculate a contact range R. Then, the processing unit 14 determines a DPI curve or a DPI value according to the contact range R. The calculating and determining method thereof are described later.

It should be mentioned that a plurality of DPI curves are preferably stored in a memory unit (not shown) or in the processing unit 14 of the touch control device 1 before shipment. Therefore, the processing unit 14 determines one of the plurality of DPI curves according to different object areas so that the touch control device 1 has the characteristic of an adaptive DPI curve.

Figure 3:
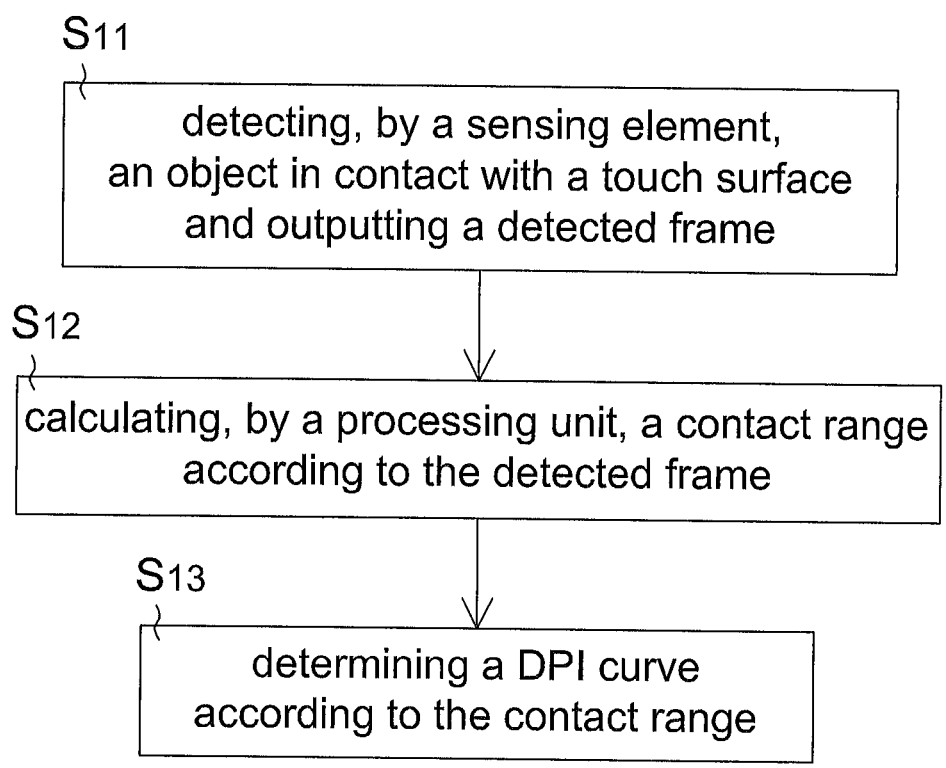
FIG. 3 is a flow chart of a method of determining an adaptive DPI curve according to a first embodiment of the present disclosure.

FIG. 3 is a flow chart of a method of determining an adaptive DPI curve according to a first embodiment of the present disclosure, which includes the following steps of: detecting, by a sensing element, an object in contact with a touch surface and outputting a detected frame (step $S_{11}$); calculating, by a processing unit, a contact range according to the detected frame (step $S_{12}$); and determining a DPI curve according to the contact range (step $S_{13}$).

Figure 4A:
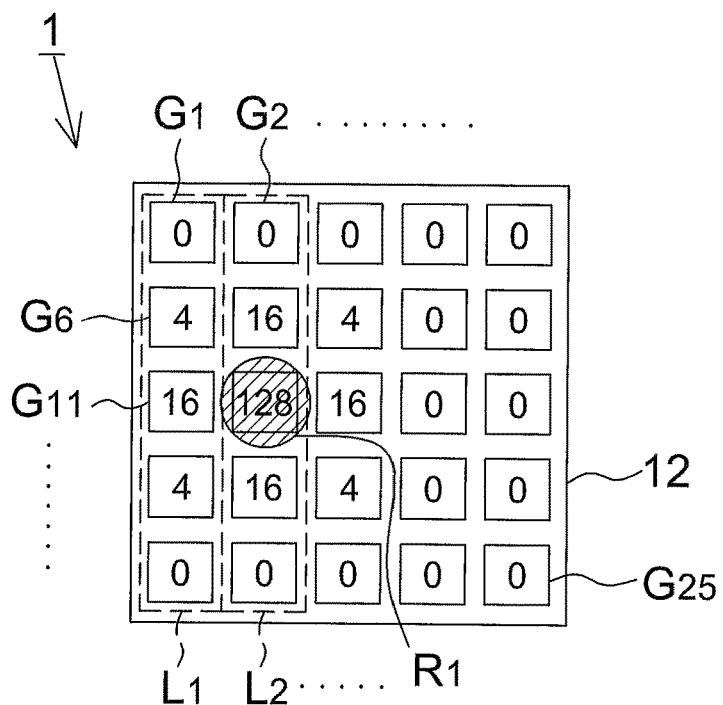
FIG. 4A is a perspective drawing of a sensing element of a touch control device according to one embodiment of the present disclosure.
Figure 4B:
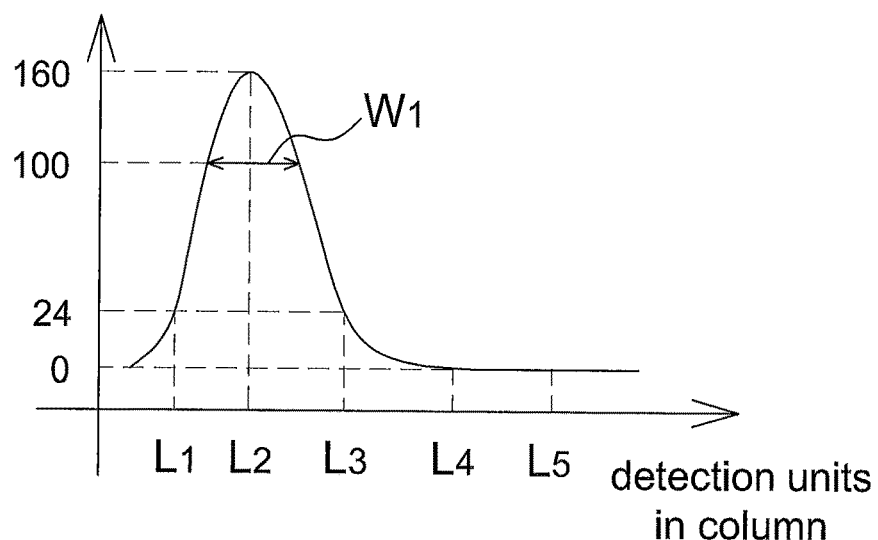
FIG. 4B is a curve diagram of the capacitance variation of the touch control device in FIG. 4A.

It should be mentioned that the sensing element 12 has a plurality of detection units. For example, FIG. 4A exemplarily shows that the plurality of detection units of the sensing element 12 are arranged in a 5×5 detection-unit array, wherein each of the detection units, from left to right and from up to down, is successively labeled as $G_1$, $G_2$ ... $G_{25}$. It is appreciated that when the touch control device 1 does not detect any object, each detection unit has a predetermined capacitance; and when the object 2 contacts the touch surface 10, the detection units induced with the object 2 in the sensing element 12 respectively generates a capacitance variation. For simplifying description, a capacitance variation is directly shown inside each detection unit in FIG. 4A. For example, the detection unit $G_6$ is shown with a capacitance variation of 4; and the detection unit $G_{25}$ is shown with a capacitance variation of 0. It should be mentioned that values shown in FIG. 4A are only intended to illustrate, not to limit the present disclosure.

Referring to FIGS. 2A, 3, 4A, 4B and 5A together, details of the present embodiment are described hereinafter.

Step $S_{11}$: Firstly, when the object 2 contacts the touch surface 10, the detection units in the sensing element 12 induced with the object 2 respectively generate a capacitance variation. It is appreciated that the detection unit closer to the object 2 has a larger capacitance variation according to the induction capacitance principle; otherwise, the detection unit farther away from the object 2 has a smaller capacitance variation or even has no capacitance variation. The sensing element 12 outputs a detected frame F containing the capacitance variation information to the processing unit 14.

Step $S_{12}$: After receiving the detected frame F from the sensing element 12, the processing unit 14 calculates a contact range $R_1$ according to the detected frame F, wherein the contact range $R_1$ reflects a contact width, a contact length or a contact area of the object 2.

In a first aspect, the processing unit 14 compares each capacitance variation with a threshold. For example, the threshold is set to be 10, and the capacitance variation of 5 of 25 detection units in the sensing element 12 (i.e. detection units $G_7$, $G_{11}$-$G_{13}$ and $G_{17}$) is larger than 10. Therefore, the comparison result (i.e. 5) is configured to calculate the contact range $R_1$. For example, the contact range $R_1$ may be 5, 25 or a multiple of 5.

In a second aspect, the processing unit 14 calculates a sum or an average value of the entire capacitance variations. For example, a sum of capacitance variations of all the detection units in the sensing element 12 is 208. Therefore, the calculating result (i.e. 208) directly indicates the contact range $R_1$ or is configured to calculate the contact range $R_1$.

In addition, the processing unit 14 further obtains a variation curve according to a sum of intensities of each column or each row of the detected frame F of the sensing element 12 and calculates the contact range $R_1$ accordingly. For example, referring to FIG. 4B, it is a capacitance variation curve of the touch control device 1 in FIG. 4A, wherein the x-axis indicates the position of detection unit column; and the y-axis indicates the sum of capacitance variations thereof. It is assumed that a threshold of the sum of capacitance variations is 100, a part of the capacitance variation curve of FIG. 4B larger than the threshold forms a width $W_1$. Therefore, the processing unit 14 calculates the contact range $R_1$ accordingly. For example, the width $W_1$ is configured to indicate a contact width or a contact area of the contact range $R_1$.

Step $S_{13}$: Finally, the processing unit 14 determines a DPI curve according to the contact range $R_1$. For example, referring to FIG. 5A, it is a schematic diagram of two DPI curves of the touch control device 1, wherein the DPI curves $DPI_1$ and $DPI_2$ are respectively associated with a contact range $R_1$. For example, the DPI curve $DPI_1$ is selected when the contact range $R_1$ is smaller than 6, and the DPI curve $DPI_2$ is selected when the contact range $R_1$ is equal to or larger than 6. When the contact range $R_1$ is calculated as 5 through the above mentioned method of the first aspect, the processing unit 14 identifies that the contact range $R_1$ satisfies the condition of the DPI curve $DPI_1$ and determines to use the DPI curve $DPI_1$. Similarly, it is assumed that the DPI curve $DPI_1$ is selected when the contact range $R_1$ is smaller than 200, and the DPI curve $DPI_2$ is selected when the contact range $R_1$ is equal to or larger than 200. When the contact range $R_1$ is calculated as 208 through the above mentioned method of the second aspect, the processing unit 14 identifies that the contact range $R_1$ satisfies the condition of the DPI curve $DPI_2$ and determines to use the DPI curve $DPI_2$. In another embodiment, the DPI curve $DPI_1$ corresponds to a first contact-range interval and the DPI curve $DPI_2$ corresponds to a second contact-range interval. The contact range is compared with a contact-range interval but not simply compared with a contact threshold.

That is to say, the method for calculating the contact range and the condition for determining the DPI curve of the processing unit 14 are previously stored in the touch control device 1 before shipment. For example, a plurality of DPI curves are previously stored in the touch control device 1, and the processing unit 14 selects one of the plurality of DPI curves according to the calculated contact range in actual operation. Therefore, no matter how the size of the object 2 operating on the touch control device 1 changes, the processing unit 14 determines a most appropriate DPI curve according to the contact range corresponding to the object 2.

Figure 5A:
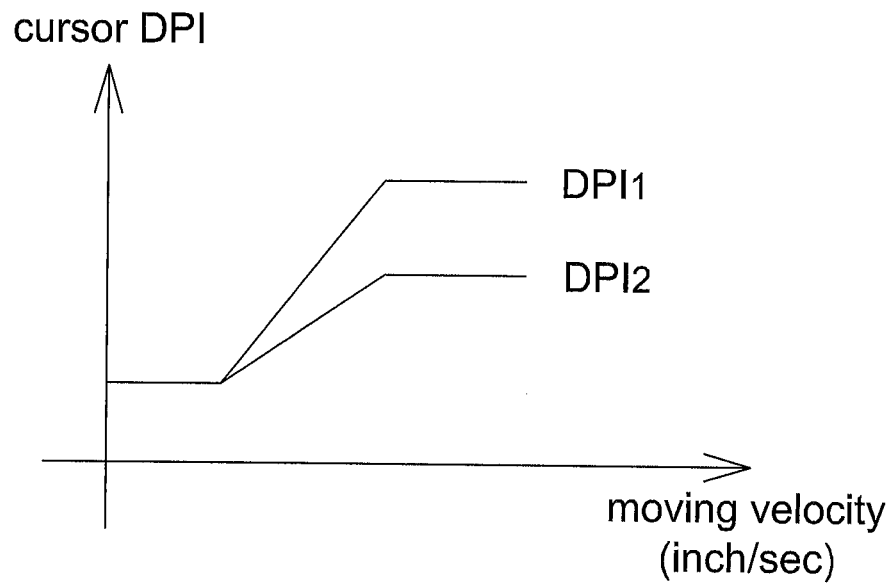
FIGS. 5A-5D are schematic diagrams of a plurality of DPI curves.
Figure 5B:
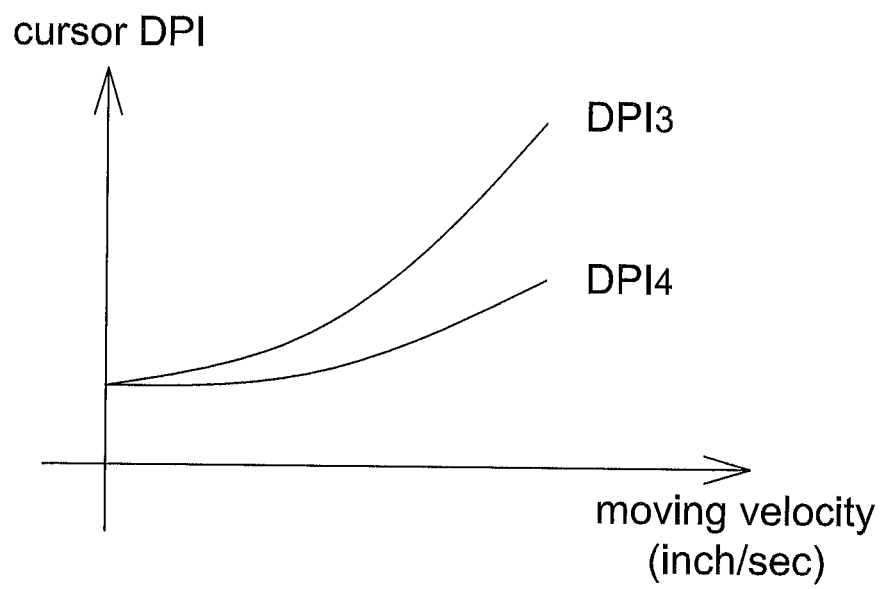
Figure 5C:
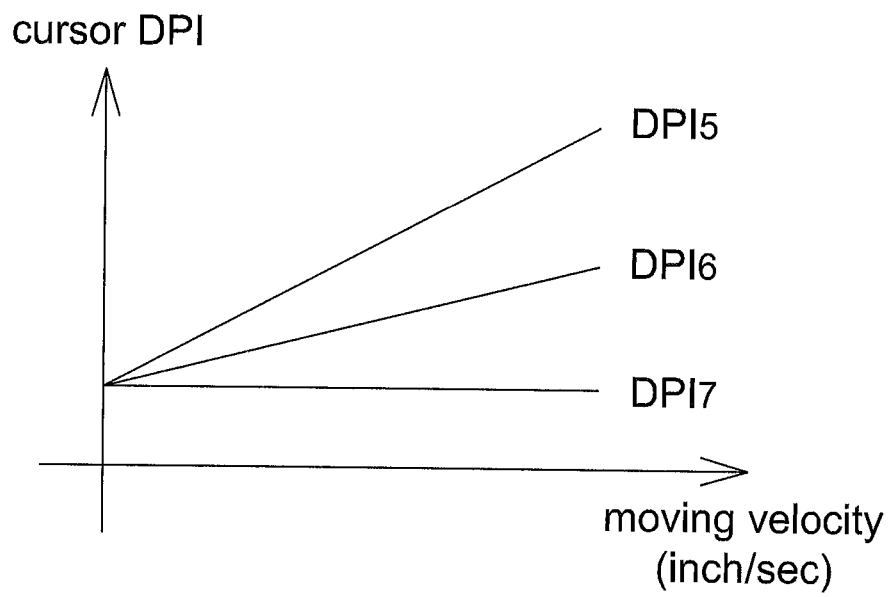
Figure 5D:
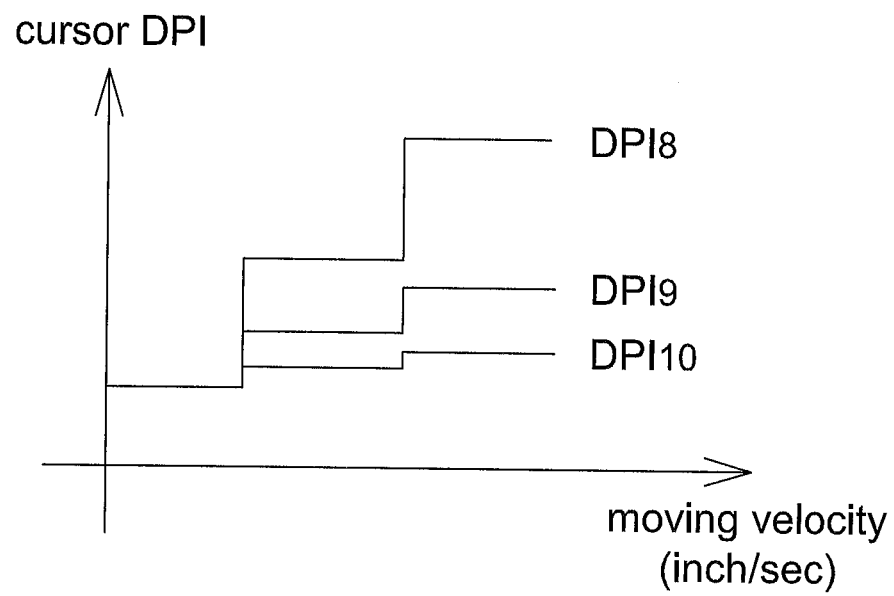

FIGS. 5A-5D are schematic diagrams of a plurality of DPI curves, wherein FIG. 5A and FIG. 5B respectively include two DPI curves; and FIG. 5C and FIG. 5D respectively include three DPI curves. The DPI curve is a straight line, an exponential curve or a monotonic increasing curve, but not limited thereto. The number and type of the DPI curve previously stored in the touch control device 1 is determined according to the actual application.

Generally speaking, when a user operates an object on the touch surface 10, the touch control device 1 outputs the displacement information at a higher cursor DPI with a faster moving velocity of the object. For example, referring to FIG. 5C, the DPI curves $DPI_5$ and $DPI_6$ indicate that the faster the moving velocity is, the higher the cursor DPI is; and the DPI curve $DPI_7$ indicates the cursor DPI does not change with the moving velocity. Therefore, a variation tendency of the DPI curve is associated with or independent from a moving velocity of the object operating on the touch surface 10. In one embodiment, it is assumed that the DPI curves $DPI_5$, $DPI_6$ and $DPI_7$ respective correspond to the operation of a thumb, an index finger and a touch pen. When the thumb or the index finger is used to operate on the touch surface 10, the touch control device 1 outputs the displacement information respectively with the DPI curve $DPI_5$ or $DPI_6$. It is appreciated that the contact range of the touch pen may be much smaller than the contact range of the thumb or the index finger. Therefore, when the touch pen is used to operate on the touch surface 10, the displacement information is outputted with a fixed cursor DPI (i.e. DPI). More specifically, when the DPI curve is irrelevant to the moving velocity of the object, the DPI curve may be a DPI value.

Figure 6:
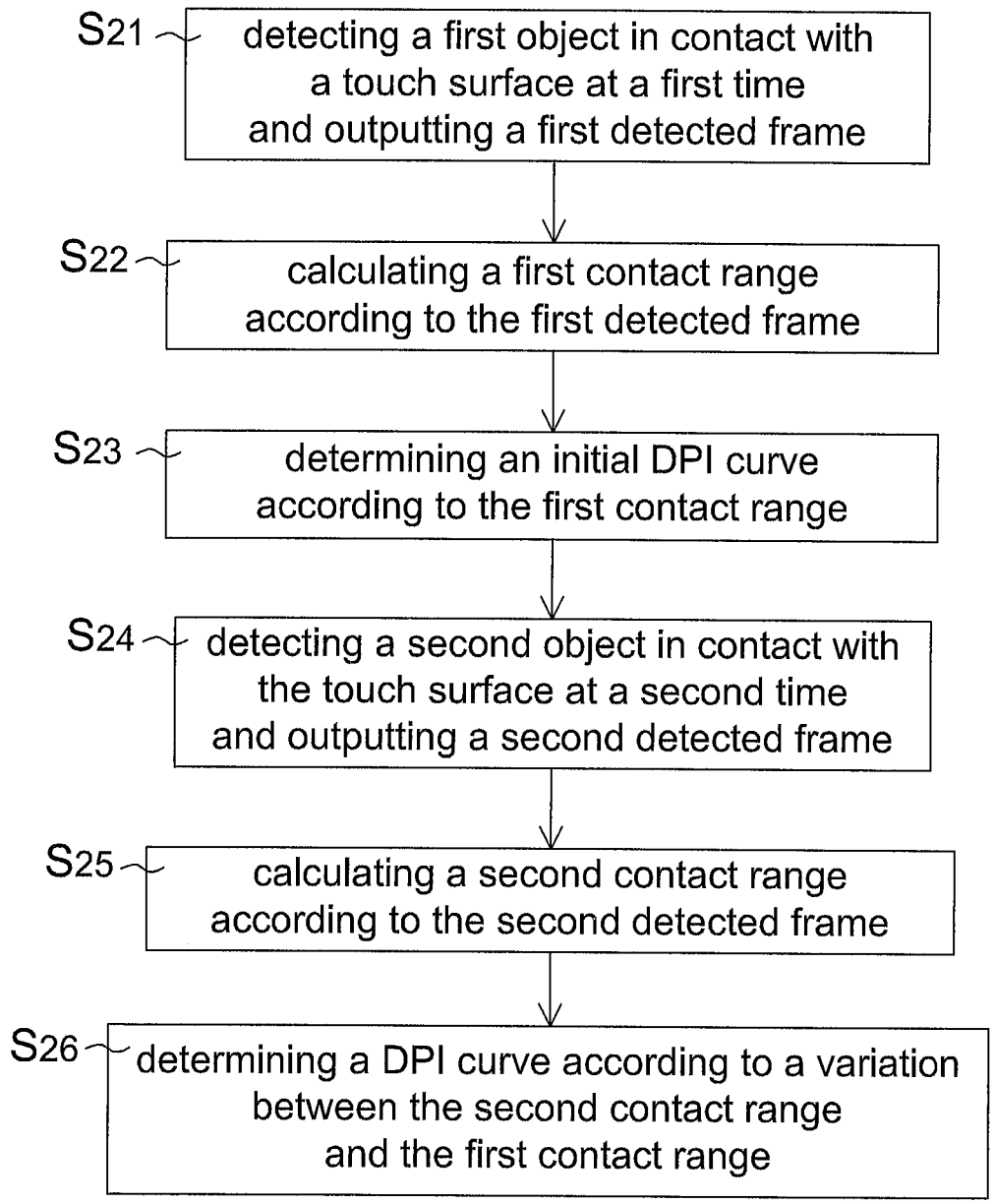
FIG. 6 is a flow chart of a method of determining an adaptive DPI curve according to a second embodiment of the present disclosure.

FIG. 6 is a flow chart of a method of determining an adaptive DPI curve according to a second embodiment of the present disclosure, which includes the following steps of: detecting, by a sensing element, a first object in contact with a touch surface at a first time and outputting a first detected frame (step $S_{21}$); calculating, by a processing unit, a first contact range according to the first detected frame (step $S_{22}$); determining an initial DPI curve according to the first contact range (step $S_{23}$); detecting, by the sensing element, a second object in contact with the touch surface at a second time and outputting a second detected frame (step $S_{24}$); calculating, by the processing unit, a second contact range according to the second detected frame (step $S_{25}$); and determining a DPI curve according to a variation between the second contact range and the first contact range (step $S_{26}$).

Figure 7A:
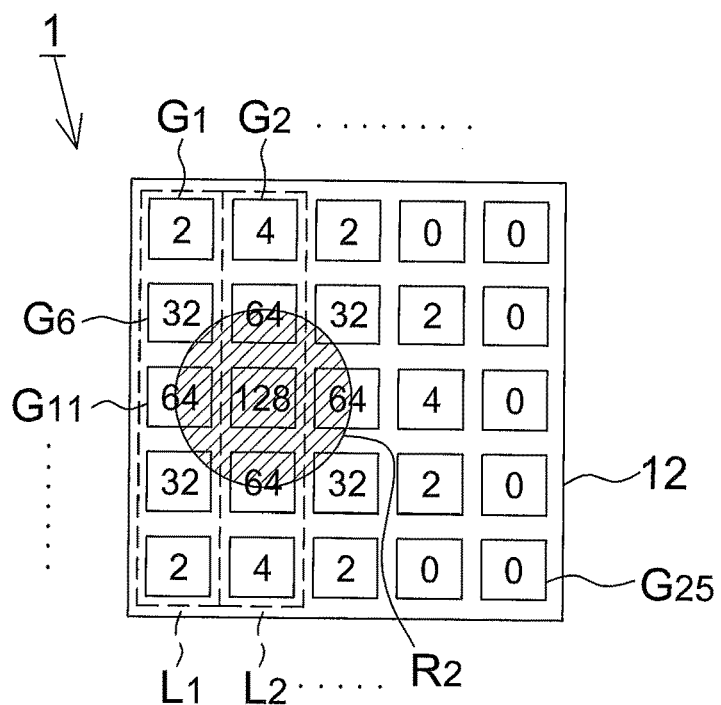
FIG. 7A is a perspective drawing of a sensing element of a touch control device according to one embodiment of the present disclosure.
Figure 7B:
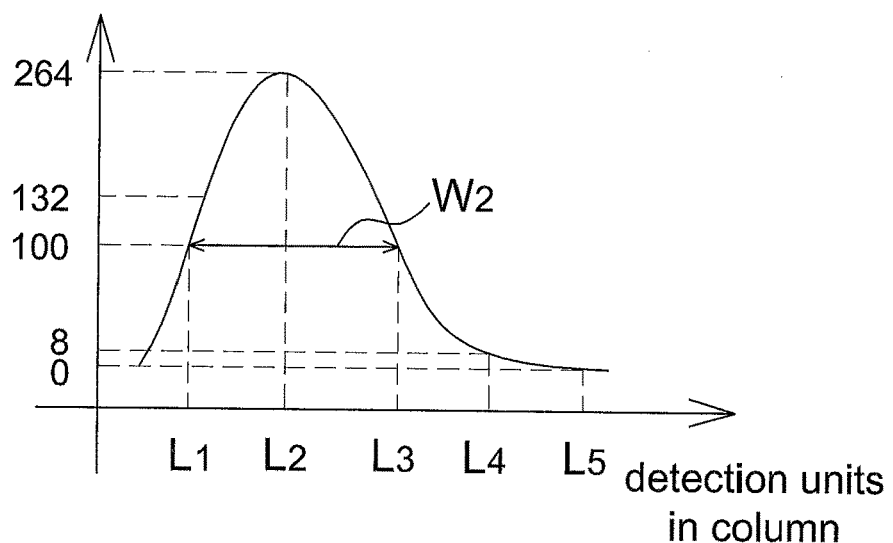
FIG. 7B is a curve diagram of the capacitance variation of the touch control device of FIG. 7A.

Referring to FIGS. 2A, 4A, 4B, 6, 7A and 7B together, it is assumed that the status of FIG. 4A is the first time and the status of FIG. 7A is the second time, and then details of the present embodiment are described hereinafter.

Step $S_{21}$: Firstly, a first object contacts the touch surface 10 at the first time, and a plurality of detection units in the sensing element 12 correspondingly generate capacitance variations, as shown in FIG. 4A. Then, the sensing element 12 outputs a first detected frame to the processing unit 14 according to the capacitance variations.

Step $S_{22}$: After receiving the first detected frame from the sensing element 12, the processing unit 14 calculates a first contact range (e.g. the contact range $R_1$) according to the first detected frame.

Step $S_{23}$: Similar to the first embodiment of the present disclosure, the processing unit 14 determines an initial DPI curve according to the first contact range. It should be mentioned that the step $S_{23}$ is configured to avoid that the touch control device 1 may not output displacement information with an appropriate DPI curve when the first object is moving on the touch surface 10 before determining a DPI curve in the step $S_{26}$. It is appreciated that when the touch control device 1 has a higher sampling rate, a time difference between the first time and the second time may be ignored. That is to say, a DPI curve is determined (i.e. the step $S_{26}$ is accomplished) before the first object begins to move, and the step $S_{23}$ is ignorable. In another embodiment, the step $S_{23}$ may not be implemented and the touch control device 1 operates with the initial DPI curve before the step $S_{21}$. The steps $S_{24}$-$S_{26}$ are configured to determine whether the contact area of the object is changed enough to change the DPI curve.

Step $S_{24}$: Then, the second object contacts the touch surface 10 at the second time, and a plurality of detection units in the sensing element 12 correspondingly generate capacitance variations, as shown in FIG. 7A. And, a second detected frame is outputted to the processing unit 14 accordingly. It is appreciated that the second object and the first object may be an identical object such as an index finger. But for the sensing element 12, objects detected at different times are identified as different objects even though the detected objects are actually an identical object.

Step $S_{25}$: Similarly, the processing unit 14 calculates a second contact range (e.g. the contact range $R_2$) according to the second detected frame.

As mentioned above, the second contact range and the first contact range of the step $S_{22}$ are respectively obtainable according to a comparison result between the detected variation of a plurality of detection units and a threshold. Or, the processing unit 14 respectively calculates a sum of intensities of each column (or each row) of the first detected frame and the second detected frame so as to obtain variation curves; and the first contact range and the second contact range are then respectively calculated according to the variation curves. The method of calculating the first contact range and the second contact range is identical with that of calculating the contact range $R_1$ according to the first embodiment of the present disclosure, and thus details thereof are not described herein.

Step $S_{26}$: Finally, the processing unit 14 determines a DPI curve according to a variation between the second contact range and the first contact range, wherein the variation is a difference value between the second contact range and the first contact range, or a result (i.e. quotient) of dividing the second contact range by the first contact range. For example, the variation is calculated by subtracting the contact range $R_1$ of FIG. 4A from the contact range $R_2$ of FIG. 7A. Or, the variation is calculated by dividing the contact range $R_2$ by the contact range $R_1$, but not limited thereto.

The difference between the determining method in the present embodiment and that in the first embodiment is that the touch control device 1 in the first embodiment determines a DPI curve according to a touch area between the object 2 and the touch surface 10; and the touch control device 1 in the second embodiment determines a DPI curve according to a variation between contact areas of the object 2 in contact with the touch surface 10.

In the above embodiments, a capacitive touch sensor is used to describe the operating method of the sensing element 12 so that the first detected frame and the second detected frame include capacitance variations of a plurality of detection units in the sensing element 12. It is appreciated that when a resistive touch sensor is used as the sensing element 12, the detected frames include voltage variations of a plurality of detection units in the sensing element 12; and when an optical touch sensor is used as the sensing element 12, the detected frames include photosensitive variations of a plurality of detection units in the sensing element 12.

It should be mentioned that DPI (dots per inch) is used to indicate the cursor moving in the above embodiments, but not limited thereto. Those skilled in this art know CPI (count per inch) can also be used to indicate the cursor moving.

In one embodiment, the processing unit 14 only determines a DPI switching signal, and an electronic device coupled with the touch control device 1 selects a DPI value or a DPI curve according to the DPI switching signal.

As mentioned above, the conventional touch control device cannot correspondingly change a DPI curve thereof corresponding to different objects. Therefore, the present disclosure provides a touch control device (FIG. 2A) and a method of determining the DPI curve (FIGS. 3 and 6) by calculating contact ranges of different objects to determine different DPI curves, and accordingly solves the problem of the inconsistency between different objects and corresponded different travel distances of the cursor.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A method of determining an adaptive dots per inch (DPI) function, the method comprising:
   detecting, by a sensing element, a first object in contact with a touch surface at a first time, and outputting first detected data;
   calculating, by a processing unit, a first contact range corresponding to the first object on the touch surface according to the first detected data;
   detecting, by the sensing element, a second object in contact with the touch surface at a second time, and outputting second detected data;
   calculating, by the processing unit, a second contact range corresponding to the second object on the touch surface according to the second detected data; and
   determining a DPI function according to a variation between the calculated second contact range of the second object and the calculated first contact range of the first object on the touch surface.

2. The method as claimed in claim 1, further comprising:
   determining an initial DPI function according to the first contact range.

3. The method as claimed in claim 1, wherein in the determining, the processing unit selects one of a plurality of DPI functions according to the variation.

4. The method as claimed in claim 1, wherein the first contact range and the second contact range are respectively obtained according to a comparison result between variations of a plurality of detection units and a threshold.

5. The method as claimed in claim 1, wherein the first contact range and the second contact range are respectively calculated according to a variation curve of a sum of intensities of each column or each row of the first detected data and the second detected data.

6. The method as claimed in claim 1, wherein the variation is a difference value or a quotient between the second contact range and the first contact range.

7. The method as claimed in claim 1, wherein the first contact range and the second contact range are contact widths, contact lengths or contact areas, and the sensing element is a capacitive touch sensor, a resistive touch sensor or an optical touch sensor.

* * * * *